(12) United States Patent
Vinecombe (10) Patent No.: US 8,252,391 B2
(45) Date of Patent: Aug. 28, 2012

(54) CARD

(76) Inventor: Barbara Jean Vinecombe, South Perth (AU)

( * ) Notice: Subject to any disclaimer, the term of this patent is extended or adjusted under 35 U.S.C. 154(b) by 0 days.

(21) Appl. No.: 11/654,125

(22) Filed: Jan. 16, 2007

(65) Prior Publication Data

US 2008/0171173 A1 Jul. 17, 2008

(51) Int. Cl.
*G09F 1/06* (2006.01)
*G09F 1/02* (2006.01)

(52) U.S. Cl. ............ 428/12; 40/124.01

(58) Field of Classification Search ............ 428/12, 428/40, 317.3; 40/124.04, 124.08, 124.09, 40/124.11, 124.12, 124.14, 124.15, 124.16, 40/124.19; D11/142
See application file for complete search history.

(56) References Cited

U.S. PATENT DOCUMENTS

| | | | |
|---|---|---|---|
| 286,642 A | 10/1883 | Schwartz | |
| 930,108 A | 8/1909 | Walcutt | |
| 2,205,262 A * | 6/1940 | Hayes | 40/124.16 |
| 2,616,199 A | 11/1952 | Robins | |
| 2,696,690 A | 12/1954 | Kellerer | |
| 3,134,708 A | 5/1964 | Lohnes | |
| 3,571,958 A | 3/1971 | Stevens | |
| 3,668,796 A | 6/1972 | Patterson | |
| 4,531,319 A | 7/1985 | Saxton | |
| 4,763,427 A | 8/1988 | Schrager | |
| 5,261,172 A | 11/1993 | Rowley | |
| 5,758,438 A * | 6/1998 | Crowell | 40/124.08 |
| 5,933,989 A * | 8/1999 | Volkert et al. | 40/124.08 |
| 5,937,553 A * | 8/1999 | Maran | 40/124.08 |
| 6,173,515 B1 | 1/2001 | Walsh | |
| 6,199,912 B1 | 3/2001 | Finkelshteyn | |
| 7,100,317 B1 | 9/2006 | Strong | |
| 7,316,085 B1 * | 1/2008 | Freeman | 40/124.14 |
| 7,409,787 B2 * | 8/2008 | Glenn | 40/124.09 |
| 7,490,425 B2 * | 2/2009 | Crowell et al. | 40/610 |
| 7,596,896 B2 * | 10/2009 | Crowell et al. | 40/124.07 |
| 2005/0152140 A1 * | 7/2005 | Frederick | 362/235 |

FOREIGN PATENT DOCUMENTS

AU 309711 S 9/2006

OTHER PUBLICATIONS

Grace Sylvan's Angel Ornament: http://crafts.kaboose.com/angel-and-singer-ornaments.html & http://www.kidsdomain.com/craft/cegif/orn/ang-horn.gif.*
DLTK Growing Together (Paper Cone Angel Craft): http://www.dltk-bible.com/angels/mconeangel.htm.*

(Continued)

*Primary Examiner* — David R Sample
*Assistant Examiner* — Nicole Gugliotta (57) ABSTRACT

An article such as a greeting card (10) comprising a sheet (11) defining a first portion (16) and a second portion (18) connected together. The first portion (16) is adapted for erection into a three-dimensional form and the second portion (18) is adapted for location adjacent the three-dimensional form. The first and second portions (16, 18) are foldably connected together, whereby the second portion (18) can be folded into the location adjacent the three-dimensional form and secured at that location. The first portion (16) has two opposed edges (26, 28) adapted to be drawn together to create the three-dimensional form. The greeting card (10) can be delivered in a collapsed condition to an intended recipient in ways similar to conventional cards and can be readily assembled into a three-dimensional form to create interest and facilitate display.

16 Claims, 6 Drawing Sheets

OTHER PUBLICATIONS

Highlights Kids (Paper-Plate Angel): http://www.highlightskids.com/Express/Crafts/Holidays/C1296_paperplateAngel.asp.*

Martha Stewart Living Magazine, Dec. 2000 Issue. "Paper-Plate Angels", "Good Things" section, p. 90 and magazine cover (2 pages).*

Confirmation of "Paper-Plate Angel" from Kristen Wendling, Martha Stewart Living (MSLO) Customer Relations Representative.*

IPAustralia—1st Examiner's Response Dec. 14, 2010 Citations D1: US 5261172 D2: US 7100317.

* cited by examiner

CARD

FIELD OF THE INVENTION

The present invention relates to an article that can transform from a collapsed condition in which is generally flat to an erected condition in which it has a three-dimensional form.

The article may be used for any appropriate purpose such as, for example: a card to convey a greeting, message or other information; a decoration; a souvenir; an ornament; or display device for advertising or other information.

BACKGROUND ART

It is known that on special occasions or as a sign of affection a card may be given by one person (the sender), to another person (the recipient). Such cards are normally manufactured in a booklet style such that the front cover incorporates a design, message, photograph or a combination of these. When the card is opened the inside cover or pages may have another design, message or photograph which may be accompanied by a message from the sender. With this arrangement, the card may be folded flat, placed in an envelope and sent by mail to the intended recipient.

Normally these cards are displayed by the recipient for a period of time. Due to the design of the card it is often difficult to display the cards. The use of a booklet style card generally means that when the card is displayed only the front cover, or the inside cover or page are displayed.

There have been various proposals to enhance the sentiment or interest engendered by greeting cards through a provision enabling them to be assembled into a three-dimensional form for display. Examples of such proposal are disclosed in U.S. Pat. Nos. 2,616,199, 2,696,690, 3,134,708, 3,571,958 and U.S. Pat. No. 6,173,515.

While such proposals may be effective in creating interest and allowing display in the three-dimensional form, they can be rather complicated to erect and/or not sufficiently stable when in the erected condition for display purposes.

The present invention seeks to overcome at least in part the aforementioned disadvantages, or alternatively provide a useful choice to the prior art arrangements referred to above.

DISCLOSURE OF THE INVENTION

According to a first aspect of the invention there is provided an article comprising a sheet defining a first portion and a second portion connected together, the first portion being adapted for erection into a three-dimensional form and the second portion being adapted for location adjacent the three-dimensional form.

Preferably, the second portion is adapted for location adjacent the three-dimensional form in an upright condition.

Preferably, the second portion is adapted to be secured in the upright condition to the three-dimensional form. An adhesive means may be provided for securing the second portion in engagement with the three-dimensional form.

Preferably, the first and second portions are foldably connected together, whereby the second portion can be folded into the location adjacent the three-dimensional form. The sheet may comprise a fold line interconnecting the first and second portions.

Preferably, the three-dimensional form provides a foreground and the second portion provides a background to the foreground.

Preferably, the first portion has two opposed edges which are drawn together to create the three-dimensional form. With this arrangement, the first portion can be turned upon itself to bring the two opposed edges together.

Preferably, the sheet comprises a single two-dimensional piece of material. With this arrangement, the sheet is substantially flat prior to erection of the first portion into the three-dimensional form.

The sheet may be made from sheet stock of any appropriate material, including paper of appropriate thickness, cardboard, plastics or parchment. Typically, the sheet stock is cut to produce the sheet of the required configuration. The sheet stock may be cut by a die-cutting process.

Preferably, the first portion comprises at least two sections, parts of the sections being integrally connected and further parts of the sections being detached, whereby one of such sections projects from another of such sections when the first portion is erected into the three-dimensional form. In one arrangement, the first portion when in the three-dimensional form may portray a body having a torso and a head, with said one section forming the head and upper part of the torso, and said another section forming the lower part of the torso. Conveniently, the first portion is cut to produce the at least two sections at the same time as the sheet stock is cut to produce the sheet of the required configuration.

Preferably, the first portion has a lower end and an upper end, wherein the upper end is provided with spaced first and second engagement means such that upon the first portion being drawn upon itself the first and second engagement means are inter-engaged to transform the first portion into three-dimensional form.

Preferably the lower end has a curved periphery so that in the three-dimensional form the first portion has a generally inverted cone shape. The first engagement means may comprise a tab and the second engagement means may comprise a slot configured to receive the tab. The tab may be notched so that upon engagement between the tab and the slot a part of the tab is located behind the portion adjacent the slot.

The first portion when erected in the three-dimensional form may be adapted to receive a weight to enhance the stability of the three-dimensional form when resting on a support surface. The weight may be attached to the particular face of the first portion which is innermost when the first portion is erected into the three-dimensional form.

The three-dimensional form may be provided with a base such that a cavity is defined within the three-dimensional form into which an object can be inserted.

The second portion may be adapted to receive attachment means to allow the assembled article to be attached to a support for display purposes. In one arrangement, the attachment means may comprise at least one magnet for attaching the article to a metallic surface, such as the door of a refrigerator or to a metallic part of a motor vehicle. In another arrangement, the attachments means may comprise a suspension element such as a cord by means of which the assembled article can be hung for display.

The article according to the invention may be configured as a card (such as, for example, a greeting card).

According to a second aspect of the invention there is provided an article comprising a sheet defining a first portion and a second portion connected together, the first portion being adapted for erection into a three-dimensional form to provide a foreground, and the second portion being adapted to provide a background to the three-dimensional form.

According to a third aspect of the invention there is provided an article formed as a sheet from a single two-dimensional piece of material, comprising at least a portion arranged to be transformed into three-dimensional form, the portion having a lower end and an upper end, wherein the upper end is provided with spaced first and second engagement means such that upon the portion being turned around upon itself the first and second engagement means are inter-engaged to transform the portion into three-dimensional form.

BRIEF DESCRIPTION OF THE DRAWINGS

The invention will be better understood by reference to the following description of several specific embodiments thereof as shown in the accompanying drawings in which.

BEST MODE(S) FOR CARRYING OUT THE INVENTION

Figure 1:
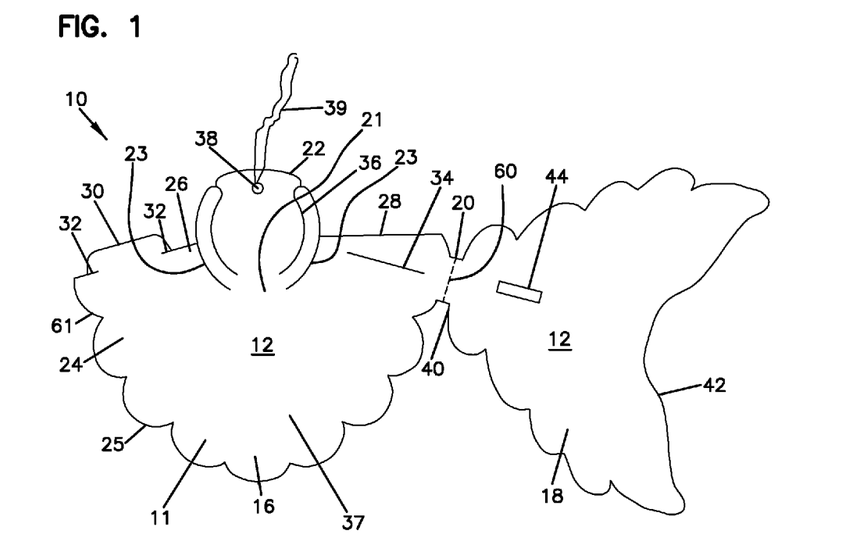
FIG. 1 is a front side view of an article according to a first embodiment, the article being configured as a greeting card and being shown in the two dimensional flat form.
Figure 2:
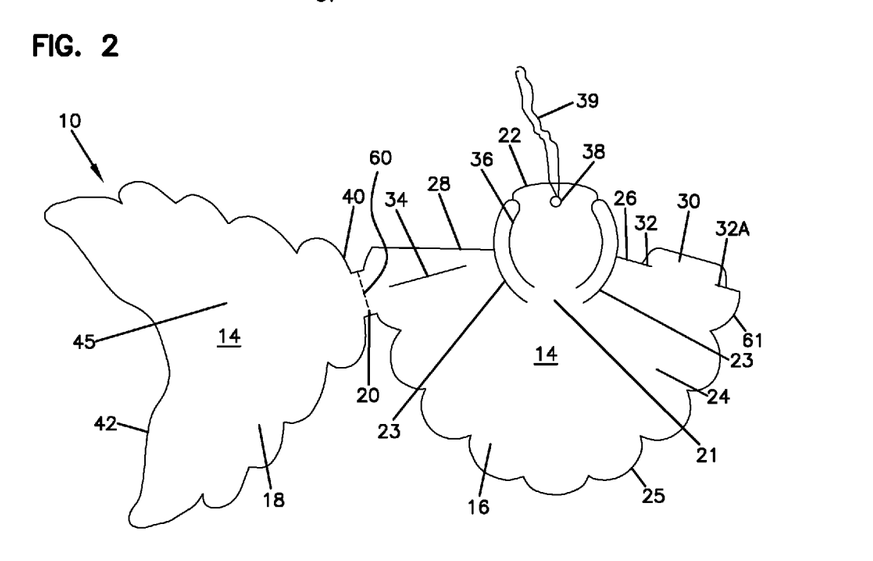
FIG. 2 is a rear side view of the greeting card of FIG. 1 in the two-dimensional form.
Figure 6:
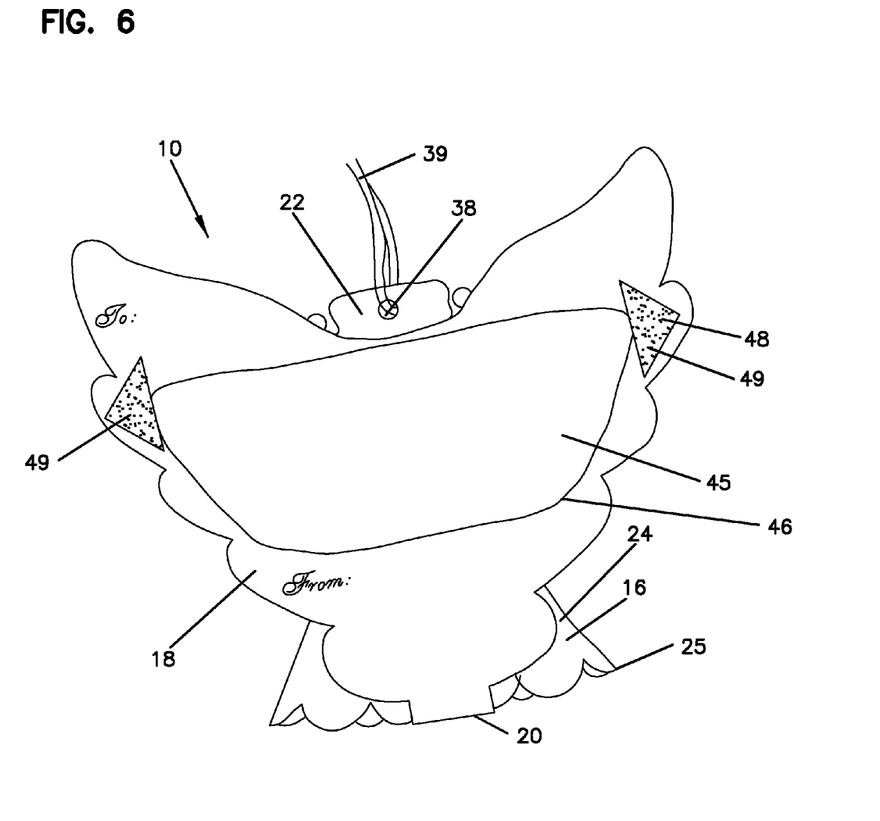
FIG. 6 is a rear elevation of the assembled greeting card, illustrating magnets and a message area to which a verse sticker can be applied.

Referring to the FIGS. 1 and 6 of the drawings, there is shown an article configured as a greeting card 10 according to the first embodiment. The greeting card 10 is illustrated in FIGS. 1 and 2 in two-dimensional form, comprising a sheet 11 having a front side 12 and a rear side 14. The sheet 11 comprises a first portion defining a foreground portion 16, and a second portion defining a background portion 18. The background portion 18 is attached to the foreground portion 16 through a fold 20. The foreground and background portions 16 and 18 are formed from a single piece of sheet material. The greeting card 10 may be manufactured from a paper stock of suitable thickness. In an alternative embodiment the greeting card may be manufactured from a wide variety of materials, such as, but not limited to, cardboard, plastic stock, or parchment. Typically, the sheet stock is cut to produce the sheet 11 of the required configuration. The sheet stock may be cut by a die-cutting process.

The foreground portion 16 may be generally of semi-circular shape and comprises an upper section 22 (as seen in the drawings) and a main body section 24. The main body section 24 comprises a curved outer lower first edge 25, a linear upper second edge 26, and a linear upper third edge 28. Edges 26 and 28 are disposed on opposite sides of the upper section 22. The curved edge 25 includes a first edge portion 60 and a second edge portion 61. In order for the greeting card 10 to form a stable structure when erected, as will be described, the curved edge 25 is preferably of a greater length than either of the linear edges 26 and 28.

The upper section 22 and the main body section 24 are formed integrally, with parts of the two sections 22, 24 being integrally connected at a junction 21 therebetween, and further parts of the two sections 22, 24 being detached along lines of separation 23. The junction 21 is centrally located and the lines of separation 23 are disposed one to each side of the junction 21, as best seen in FIGS. 1 and 2. The lines of separation 23 are defined by slits in the sheet 11, the slits being formed at the same time as the sheet stock is cut to produce the sheet 11 of the required configuration.

Figures 3, 4, 5:
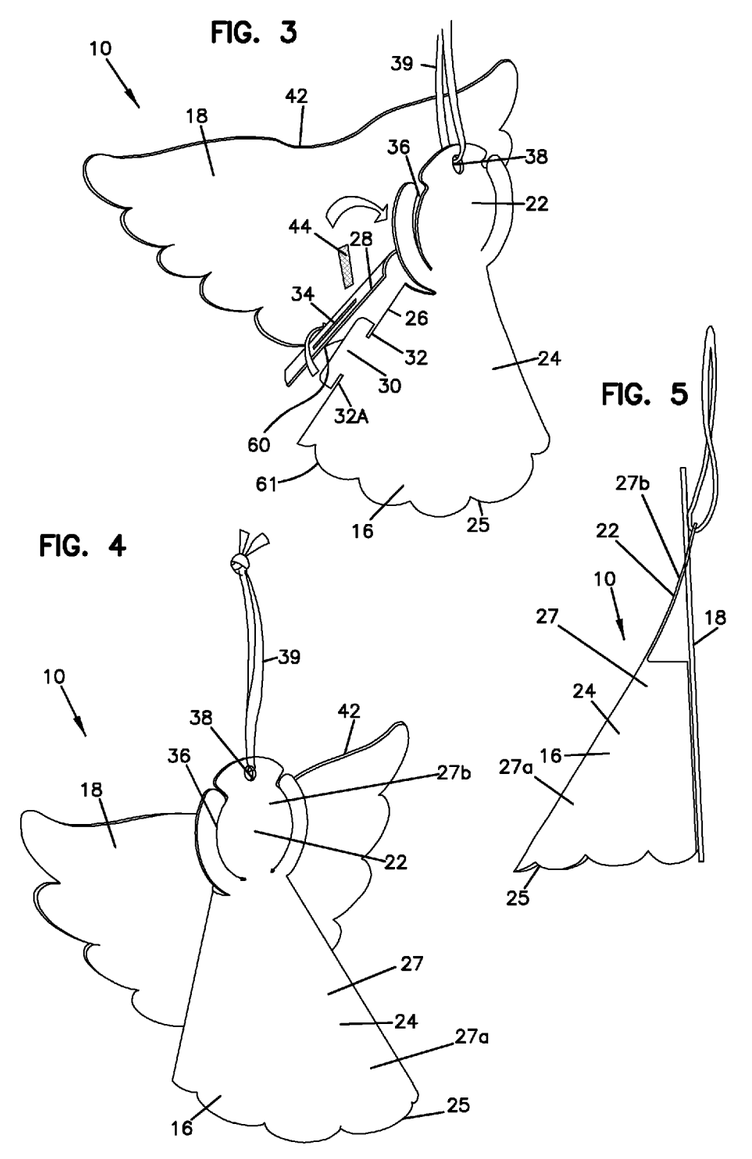
FIG. 3 is a front perspective view of the greeting card in the process of being assembled into three-dimensional form.
FIG. 4 is a front perspective view of the greeting card in the assembled three-dimensional form.
FIG. 5 is a side elevation of the greeting card as shown in FIG. 4.

With this arrangement, the upper section 22 projects from the main body section 24 when the greeting card 10 is erected, as shown in FIGS. 4 and 5. In the arrangement shown, the foreground portion 16, when in the three-dimensional form, portrays a body 27 having a torso 27a and a head 27b, with the upper section 22 forming the head and upper part of the torso, and the main body section 24 section forming the lower part of the torso. In this embodiment, the body 27 depicts an angel and the background portion 18 represents wings of the angel.

The upper section 22 may be substantially circular in shape. Alternatively, the upper section 22 may be of a differing shape, such as, but not limited to, a square, triangle or oval shape. The upper section 22 may include curved slits 36—in the sheet 11 so that an appendage portion, such as, but not limited to, an arm portion, may be incorporated.

Located adjacent to the linear edge 26 is a tab 30. The tab 30 is formed with notches in the form of slits 32 in sheet at the junction of the tab 30 and the linear edge 26. A slot 34 is located adjacent to the linear edge 28. The slot 34 is in the form of a slit in the material extending at a spaced location from the linear edge 28. The slot 34 is smaller in length than the longest length of the tab 30.

Remote from the junction of the upper section 22 and main body section 24 is an aperture 38. In use, the aperture 38 may be utilized to hang the assembled card 10 for display purposes. The assembled card 10 may be hung directly on a fixture such as a peg or hook, or alternatively suspended from a cord 39, such as a ribbon or thread, threaded through the aperture 38.

The front side 12 may contain a main message area 37 which is centrally located. The message area 37 may contain a greeting corresponding to the intended sentiment of the greeting card 10. The front side 12 may also contain any number of designs or markings.

The background portion 18 may be shaped such that is has a narrow end 40 and a broad end 42. The background portion 18 is attached to the foreground portion 16 at the narrow end 40. The greeting card 10 contains the fold 20 at the junction of these two portions 16 and 18. In an alternative embodiment of this invention the background portion 18 may be of a differing shape, such as, but not limited to, a circle, square or triangle shape. The background portion 18 may contain any number of designs or markings.

Centrally located on the front side 12 of the background portion 18 is an adhesive means 44, such as, but not limited to, double-sided tape.

The rear side 14 of the background portion 18 incorporates a secondary message area 45 for the inclusion of a message or greeting. The greeting card 10 may be supplied with a selection of available messages, typically in verse form. Each message may be on a sticker, and the card sender would simply select one of the available messages and apply the sticker 46 bearing the selected message to the message area 45, as shown in FIG. 6.

The rear side 14 may also include an attachment means 48 to allow the assembled card 10 to be attached to a support for display purposes. In the arrangement shown, the attachment means 48 comprises magnets 49 for attaching the assembled card to a metallic surface, such as the door of a refrigerator or to a metallic part of a motor vehicle. In an alternative arrangement, the attachment means may be, but is not limited to, an adhesive such as a glue, gum or adhesive tape.

In order to assemble the greeting card 10, and as illustrated in FIG. 3, the foreground portion 16 is turned around on itself such that the linear edges 26 and 28 are brought towards each other in order to form an inverted conical shape as shown in FIGS. 4 and 5, with the upper section 22 located adjacent the point of the cone and the curved edge 25 now forming a base of the greeting card 10. Once brought together, the linear edges 26 and 28 are orientated such that the tab 30 is behind the linear edge 28 adjacent the slot 34. Such orientation allows insertion of the tab 30 into the slot 34. The tab 30 is presented angularly to the slot 34 to allow the tab so to enter the slot 34. After insertion, the tab 30 is internally located within the greeting card 10. The inverted conical shape of the greeting card 10 allows for a greater structural stability. This may prevent the greeting card 10 being easily knocked over should it be subjected to movements of air.

The background portion 18 may then be folded on the fold 20 such that the front side 12 is oriented adjacent to the linear edges 26 and 28 of the foreground portion 16. The adhesive means 44 is used to adhere the front side 12 of the background portion 18 to the main body section 24. In alternative arrangements, another suitable adhesive means may be used, such as, but not limited to, a glue or gum.

To complete the assembly of the greeting card, the cord 39 may be threaded through the aperture 38 in the upper section 22.

If so desired, the greeting card 10 may be further folded such that the conical shape of foreground portion 16 is flattened, forming a triangle. In this way the greeting card 10 may be used for other purposes such as, for example, as a bookmark.

Figure 7:
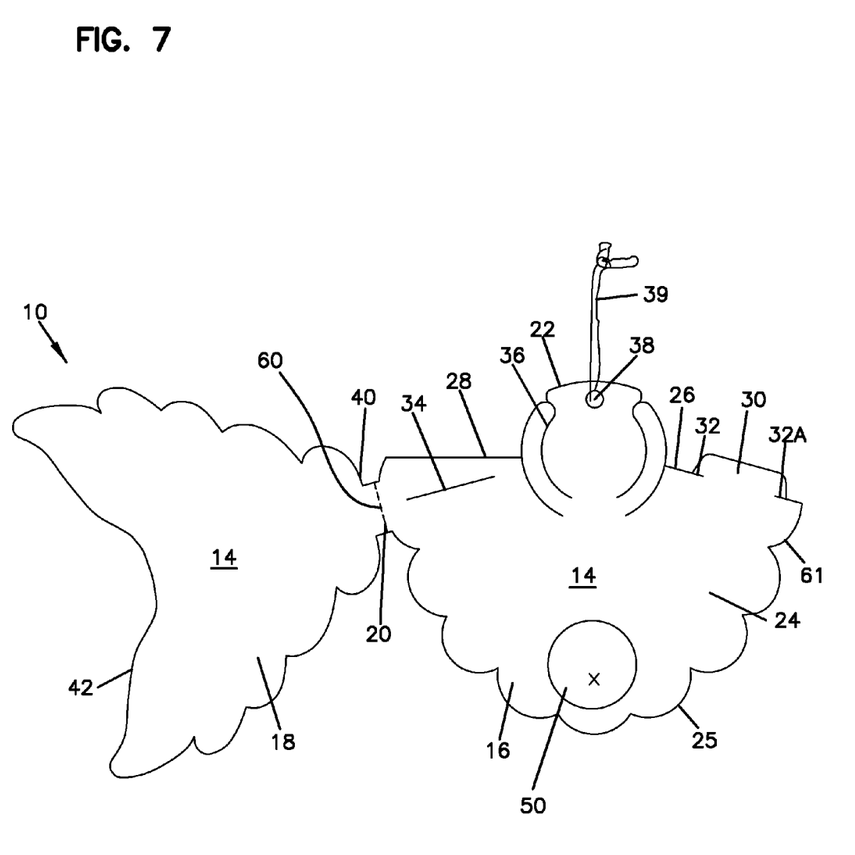
FIG. 7 is a rear side view of the greeting card according to a second embodiment, illustrating a weight applied to the greeting card prior to assembly thereof.
Figure 8:
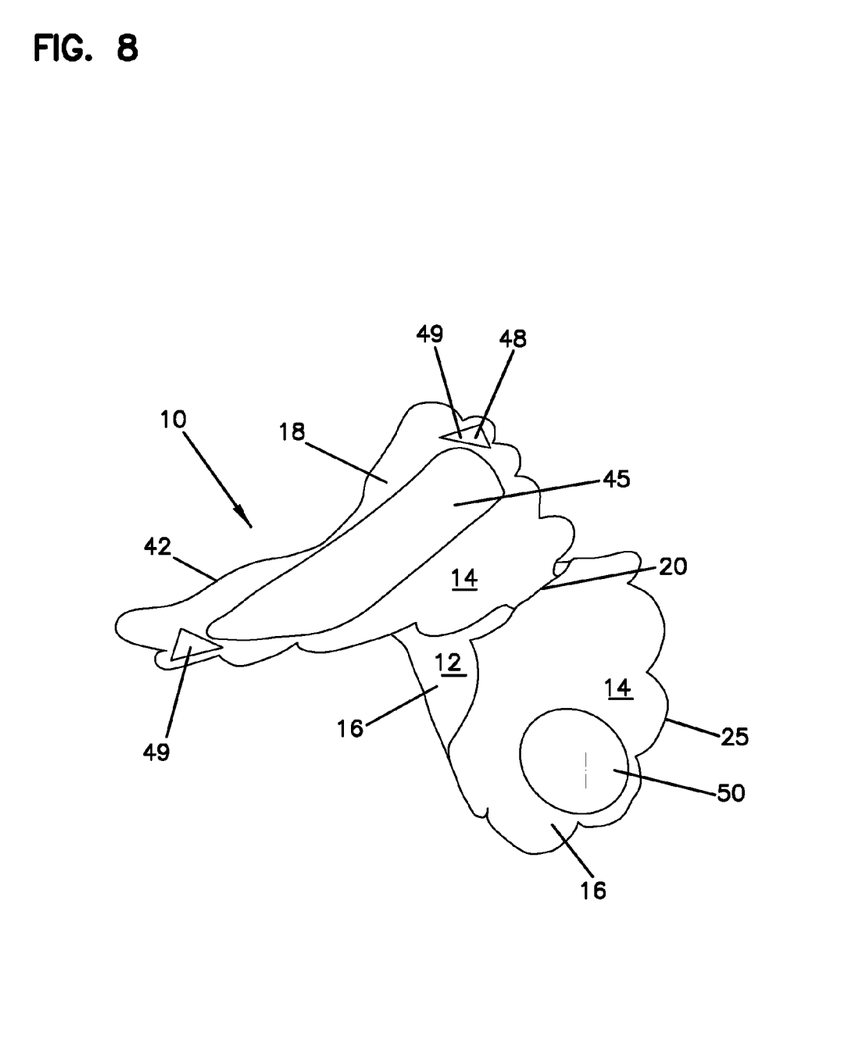
FIG. 8 is an underside perspective view of the greeting card of FIG. 7 in the assembled condition.

Referring now to FIGS. 7 and 8 there is shown a greeting card 10 according to a second embodiment. The greeting card according to the second embodiment is similar in many respects to the greeting card of the first embodiment and so corresponding reference numerals are used to identify similar parts. In this second embodiment, the foreground portion 16 is adapted to receive a weight 50 to provide stability to the assembled card when resting on a support surface such as a shelf. The weight 50 can assist the assembled card to resist disturbances such as air movement and unintentional knocks. While the weight 50 may take any appropriate form, a coin has been found to be particularly convenient. In the arrangement shown, the rear side 14 has a location marked adjacent the curved edge 25 remote from the linear edges 26, 28 at which the weight 50 can be attached, preferably adhesively.

Figure 9:
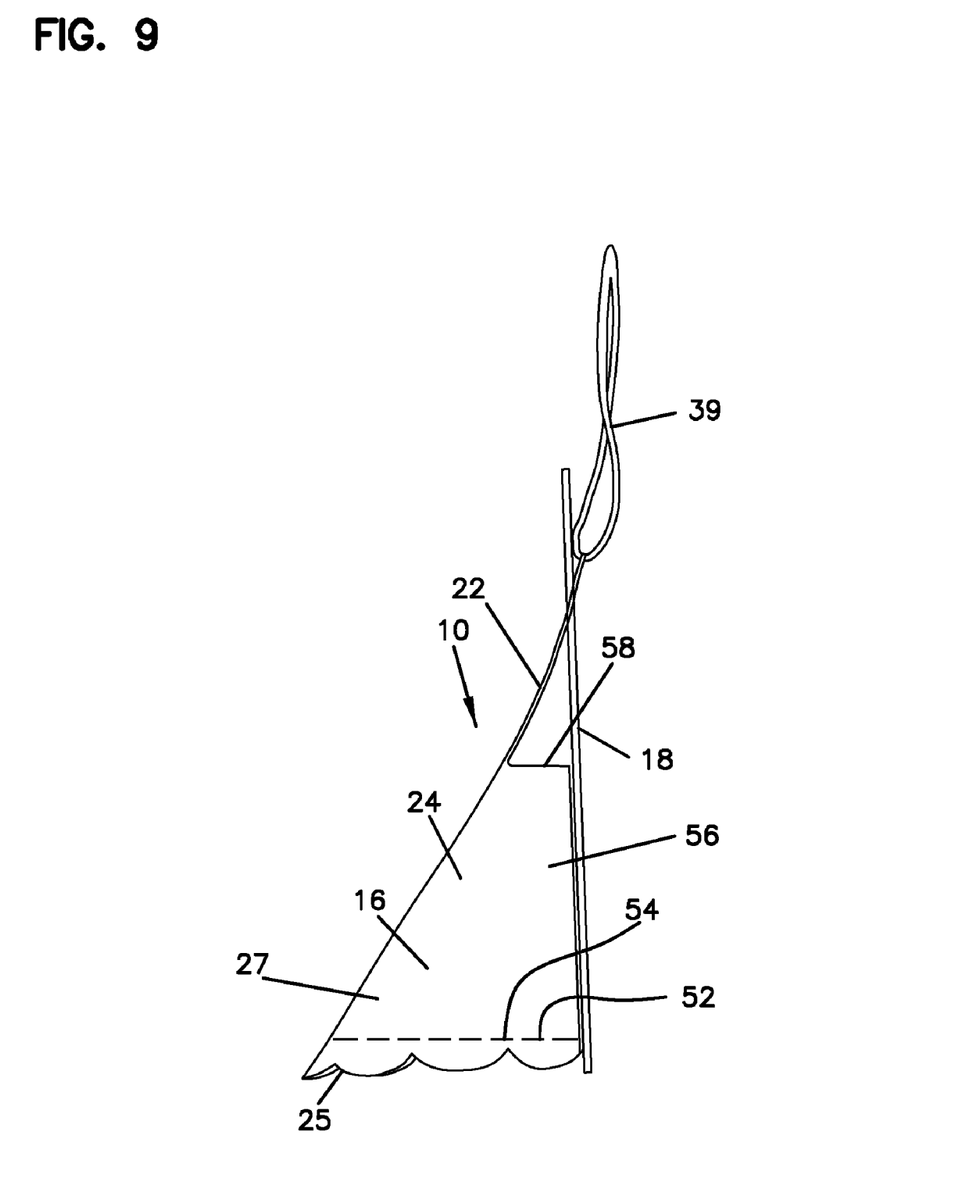
FIG. 9 is a side elevation of a greeting card according to a third embodiment.

Referring now to FIG. 9 there is shown a greeting card 10 according to a third embodiment. The greeting card according to the third embodiment is similar in many respects to the greeting card of the first embodiment and so corresponding reference numerals are used to identify similar parts. In this third embodiment, there is a panel 52 which provides a base 54 for the interior 56 of the three-dimensional form created upon erection of the foreground portion 16. With this arrangement, the interior 56 can define a cavity for receiving and containing an object inserted through an open top 58. In this way, a small gift for presentation to the recipient of the card can be accommodated in the cavity. One application to which the card according to this embodiment is particularly suitable is for a child who has lost a tooth. The child can insert the lost tooth in the cavity whereby it can be exchanged later for a coin or other small gift by a "tooth fairy".

Alternatively, the assembled card 10 can be simply placed over an object intended as a gift, with the object being accommodated within the confines of the three-dimensional form.

From the foregoing, it is evident that the various embodiments each provide a simple yet highly effective greeting card which can be delivered to an intended recipient in ways similar to conventional cards but which can be readily assembled into a three-dimensional form to create interest and facilitate display.

It should be appreciated that the scope of the invention is not limited to the scope of the various embodiments described.

Modifications and variations as would be apparent to a skilled addressee are deemed to be within the scope of the present invention.

Throughout the specification, unless the context requires otherwise, the word "comprise" or variations such as "comprises" or "comprising", will be understood to imply the inclusion of a stated integer or group of integers but not the exclusion of any other integer or group of integers.

The claims defining the invention is as follows:

1. An article comprising a sheet defining a first portion and a second portion connected together, wherein the first portion defines a foreground portion and the second portion defines a background portion, the background portion being connected to the foreground portion by a fold and is arranged to be folded to an upright position adjacent to and behind the foreground portion, wherein the first portion being adapted for erection into a three-dimensional form having a bottom end, and the second portion being adapted for location adjacent the three-dimensional form, the first portion having a first edge which defines the bottom end when the first portion is erected into the three-dimensional form, wherein the first edge is curved and connects to the second portion via the fold and wherein the first portion further comprises opposed second and third edges adapted to be drawn together to create the three-dimensional form, the curved first edge terminating at the second and third edges, wherein the first edge comprises a first edge portion and a second edge portion, the first and second edge portions are a first distance apart when the first portion is flat, and are a second distance apart, shorter than the first distance, when the first portion is erected into the three-dimensional form, and wherein one of the first and second edge portions comprises part of an edge of the second portion when the first portion is flat.

2. An article according to claim 1 wherein the second portion is adapted to be secured in the upright condition to the three-dimensional form.

3. An article according to claim 1 wherein an adhesive means is provided for securing the second portion in engagement with the three-dimensional form.

4. An article according to claim 1 wherein the sheet comprises a single piece of material.

5. An article according to claim 1 wherein the first portion comprises at least two sections, parts of the sections being integrally connected and further parts of the sections being detached, whereby one of such sections projects from another of such sections when the first portion is erected into the three-dimensional form.

6. An article according to claim 5 wherein the first portion when in the three-dimensional form portrays, a body having a torso and a head, with said one section forming the head and upper part of the torso, and said another section forming the lower part of the torso.

7. An article according to claim 1 wherein the first portion has a lower end and an upper end, and wherein the upper end is provided with spaced first and second engagement means such that upon the first portion being folded upon itself and the first and second engagement means are inter-engaged to transform the first portion into three-dimensional form.

8. An article according to claim 7 wherein the lower end has a curved periphery so that in the three-dimensional form the article has generally inverted cone shape.

9. An article according to claim 7 wherein the first engagement means comprises a tab and the second engagement means comprises a slot configured to receive the tab.

10. An article according to claim 9 wherein the tab is notched so that upon engagement between the tab and the slot, a part of the tab is located behind the portion adjacent the slot.

11. An article according to claim 1 wherein the first portion when erected in the three-dimensional form is adapted to receive a weight to enhance the stability of the three-dimensional form when resting on a support surface.

12. An article according to claim 11 wherein the weight is attached to the particular face of the first portion which is innermost when the first portion is erected into the three-dimensional form.

13. An article according to claim 1 wherein the three-dimensional form is provided with a base such that a cavity is defined within the three-dimensional form into which an object can be inserted.

14. An article according to claim 1 wherein the second portion is adapted to receive attachment means to allow the assembled article to be attached to a support for display purposes.

15. An article according to claim 14 wherein the attachment means comprises at least one magnet for attaching the article to a metallic surface.

16. An article according to claim 14 wherein the attachment means comprises a suspension element by means with which the assembled article can be hung for display.

* * * * *